US010939086B2

(12) United States Patent
Wang et al.

(10) Patent No.: US 10,939,086 B2
(45) Date of Patent: Mar. 2, 2021

(54) METHODS AND APPARATUS FOR ENCODING AND DECODING VIRTUAL REALITY CONTENT

(71) Applicant: MEDIATEK Singapore Pte. Ltd., Solaris (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/245,113

(22) Filed: Jan. 10, 2019

(65) Prior Publication Data
US 2019/0222822 A1   Jul. 18, 2019

Related U.S. Application Data

(60) Provisional application No. 62/618,656, filed on Jan. 18, 2018, provisional application No. 62/618,099, filed on Jan. 17, 2018.

(51) Int. Cl.
*H04N 13/178*   (2018.01)
*H04N 13/161*   (2018.01)
(Continued)

(52) U.S. Cl.
CPC ......... *H04N 13/178* (2018.05); *G06F 16/282* (2019.01); *G06F 16/438* (2019.01);
(Continued)

(58) Field of Classification Search
CPC .. H04N 13/178; H04N 13/161; G06F 16/438; G06F 16/483; G06F 16/282; G06F 16/48
(Continued)

(56) References Cited

U.S. PATENT DOCUMENTS

2007/0086739 A1   4/2007   Kikuchi et al.
2009/0055417 A1*  2/2009   Hannuksela ..... H04N 21/85406
(Continued)

FOREIGN PATENT DOCUMENTS

CN   101711483 A   5/2010
CN   101897193 A   11/2010
(Continued)

OTHER PUBLICATIONS

[No Author Listed], Information technology—Coded representation of immersive media (MPEG-I)—Part 2: Omnidirectional media format. ISO/IEC JTC1/SC29/WG11. Dec. 11, 2017:178 pages.
(Continued)

*Primary Examiner* — Thai Q Tran
*Assistant Examiner* — Nienru Yang
(74) *Attorney, Agent, or Firm* — Wolf, Greenfield & Sacks, P.C.

(57) ABSTRACT

The techniques described herein relate to methods, apparatus, and computer readable media configured to process multimedia data. The multimedia data includes a hierarchical track structure with at least a first track and a second track, such that the first track is at a first level in the hierarchical track structure and the second track is at a second level in the hierarchical track structure above the first level of the first track. First metadata is contained within the first track and second metadata is contained within the second track. The multimedia data can be decoded by performing, based on the first metadata and the second metadata, a track derivation operation on the media data associated with the first track to generate the media data of the second track such that the second track is a derived track of the first track.

21 Claims, 12 Drawing Sheets

(51) Int. Cl.
G06F 16/28 (2019.01)
G06F 16/483 (2019.01)
G06F 16/438 (2019.01)
G06F 16/48 (2019.01)

(52) U.S. Cl.
CPC ............ *G06F 16/48* (2019.01); *G06F 16/483* (2019.01); *H04N 13/161* (2018.05)

(58) Field of Classification Search
USPC .......................................................... 348/43
See application file for complete search history.

(56) References Cited

U.S. PATENT DOCUMENTS

| | | | |
|---|---|---|---|
| 2012/0023250 A1* | 1/2012 | Chen | H04N 21/234327 709/231 |
| 2012/0221741 A1 | 8/2012 | Frojdh et al. | |
| 2017/0195697 A1 | 7/2017 | Nair et al. | |
| 2017/0237965 A1* | 8/2017 | Wang | H04N 21/85406 348/42 |
| 2018/0063505 A1 | 3/2018 | Lee et al. | |
| 2018/0213216 A1 | 7/2018 | Hwang et al. | |
| 2018/0332265 A1 | 11/2018 | Hwang et al. | |
| 2019/0141311 A1 | 5/2019 | Lee et al. | |
| 2019/0253734 A1 | 8/2019 | Lee et al. | |
| 2019/0306519 A1 | 10/2019 | Chen et al. | |
| 2019/0313081 A1 | 10/2019 | Oh | |
| 2019/0313084 A1 | 10/2019 | Chavez et al. | |
| 2019/0320155 A1 | 10/2019 | Wang et al. | |

FOREIGN PATENT DOCUMENTS

| | | | |
|---|---|---|---|
| CN | 102132562 A | 7/2011 | |
| WO | WO-2017140946 A1 * | 8/2017 | ........... H04N 13/161 |

OTHER PUBLICATIONS

[No Author Listed], Information technology—Coding of audio-visual objects, Part 12: ISO base media file format. International Standard, ISO/IEC 14496-12, Fifth Edition. Feb. 20, 2015:250 pages.

Hannuksela et al., Technology under Consideration on sub-picture composition track grouping for OMAF. International Organisation for Standardisation, Coding of Moving Pictures and Audio, ISO/IEC JTC1/SC29/WG11 MPEG2017/N17279. Oct. 2017: 6 pages.

Wang et al., Deriving Composite Tracks in ISOBMFF using Track Grouping Mechanisms. Organisation for Standardisation, Coding of Moving Pictures and Audio, ISO/IEC JTC1/SC29/WG11 MPEG2016/M40384. Apr. 2017:12 pages.

Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.

Wang et al., Deriving VR Projection and Mapping related Tracks in ISOBMFF. International Organisation for Standardisation, Coding of Moving Pictures and Audio, ISO/IEC JTC1/SC29/WG11 MPEG2016/M40385. Apr. 2017:8 pages.

Wang et al., Deriving VR ROI and Viewport related Tracks in ISOBMFF. International Organisation for Standardisation, Coding of Moving Pictures and Audio, ISO/IEC JTC1/SC29/WG11 MPEG2016/M40412. Apr. 2017:11 pages.

[No Author Listed], Information technology—Coded representation of immersive media—Part 2: Omnidirectional media format. ISO/IEC JTC1/SC29/WG11 23090-2:2018(E) w17399. 2018:168 pages.

[No Author Listed], Information technology—Coding of audio-visual objects—Part 15: Carriage of network abstraction layer (NAL) unit structured video in the ISO base media file format. ISO/IEC FDIS 14496-15:2014(E). Jan. 13, 2014. 2014:182 pages.

[No Author Listed], Information technology—MPEG systems technologies—Part 12: Image File Format. ISO/IEC FDIS 23008-12 2nd Edition MPEG N16657. Jun. 26, 2015:93 pages.

Singer et al., Technologies under Consideration for ISOBMFF. International Organisation for Standardisation, Coding of Moving Pictures and Audio, ISO/IEC JTC1/SC29/WG11 MPEG2017/N17379. Jan. 2018:38 pages.

Wang et al., [OMAF] Editor's Input Text for OMAF WD Based on Finland AHG Agreements. International Organisation for Standardisation, Coding of Moving Pictures and Audio, ISO/IEC JTC1/SC29/WG11/M42923-v1. Jul. 2018:199 pages.

[No Author Listed], Information technology—Coded representation of immersive media (MPEG-I)—Part 2: Omnidirectional media format. ISO/IEC FDIS 23090-2:201x (E). Feb. 7, 2018:178 pages.

Wang et al., OMAF: Track Derivation Hierarchy Approach to Association of Attributes and Metadata to Sub-Picture Composition Tracks. International Organisation for Standardisation, Coding of Moving Pictures and Audio, ISO/IEC JTC1/SC29/WG11 MPEG2017/m42120. Jan. 2018:4 pages.

Wang et al., WD 4 of ISO/IEC 23090-2 OMAF 2nd edition. International Organisation for Standardisation, Coding of Moving Pictures and Audio, ISO/IEC JTC1/SC29/WG11 N18227-v1. Jan. 2019:220 pages.

U.S. Appl. No. 16/381,846, filed Apr. 11, 2019, Wang et al.

* cited by examiner

```
aligned(8) class TrackGridComposition extends TransformProperty ('tgcp') {
    unsigned int(4) version = 0;     1002
    unsigned int(4) flags;           1004
    FieldLength = ((flags & 1) + 1) * 16;    1006
    unsigned int(FieldLength) output_width;
    unsigned int(FieldLength) output_height;   1008
    unsigned int(8) rows_minus_one;
    unsigned int(8) columns_minus_one;   1010
}
```

1000

```
aligned(8) class TrackGridMatrixComposition extends TransformProperty
('tgmc') {
    unsigned int(8) rows_minus_one;      1032
    unsigned int(8) columns_minus_one;   1034
}
```

1030

```
aligned(8) class TrackGridSubpictureComposition extends TransformProperty
('tgsc') {
    unsigned int(8) rows_minus_one;      1062
    unsigned int(8) columns_minus_one;   1064
}
```

$$(p\ q\ 1) * \begin{vmatrix} a & b & u \\ c & d & v \\ x & y & w \end{vmatrix} = (m\ n\ z)$$

$m = ap + cq + x;\ n = bp + dq + y;\ z = up + vq + w;$ $p' = m/z;\ q' = n/z$

1100

```
aligned(8) class SubPictureCompositionBox extends
TrackGroupTypeBox('spco') {
    SubPictureRegionBox();    ← 1202
    // optional boxes
}
```

1200

```
aligned(8) class SubPictureRegionBox extends
FullBox('sprg',0,0) {
    unsigned int(16) track_x;          ← 1252
    unsigned int(16) track_y;          ← 1254
    unsigned int(16) track_width;      ← 1256
    unsigned int(16) track_height;     ← 1258
    unsigned int(16) composition_width;   ← 1260
    unsigned int(16) composition_height;  ← 1262
}
```

1250

FIG. 12 ical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

METHODS AND APPARATUS FOR ENCODING AND DECODING VIRTUAL REALITY CONTENT

RELATED APPLICATIONS

This Application claims priority under 35 U.S.C. § 119(e) to U.S. Provisional Application Ser. No. 62/618,099, filed Jan. 17, 2018, entitled "METHODS AND APPARATUS OF ASSOCIATING, STORING AND SIGNALING VR ATTRIBUTES AND METADATA" and U.S. Provisional Application Ser. No. 62/618,656, filed Jan. 18, 2018, entitled "METHODS AND APPARATUS OF COMPOSITION TRACK DERIVATION IN ISOBMFF," each of which is hereby incorporated by reference in its entirety.

TECHNICAL FIELD

The techniques described herein relate generally to video coding, and particularly to associating, storing and/or signaling virtual reality (VR) attributes and/or metadata, and composition track derivation.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for associating, storing and/or signaling virtual reality (VR) attributes and/or metadata, and track composition.

Some embodiments relate to a decoding method for decoding video data. The method comprises receiving multimedia data comprising a hierarchical track structure comprising at least a first track and a second track, wherein the first track is at a first level in the hierarchical track structure, and the second track is at a second level in the hierarchical track structure above the first level of the first track. The method comprises determining first metadata contained within the first track and second metadata contained within the second track. The method comprises decoding the multimedia data, comprising performing, based on the first metadata and the second metadata, a track derivation operation on the media data associated with the first track to generate the media data of the second track such that the second track is a derived track of the first track.

In some examples, the first track or the second track comprises a spherical three-dimensional content track, and determining the first metadata or the second metadata comprises determining stereoscopic video track grouping metadata, wherein the stereoscopic video track grouping metadata comprises data indicative of whether the spherical content track is for a left or right view of a stereoscopic view.

In some examples, the first track or the second track comprises a projected two-dimensional track, and determining the first metadata or the second metadata comprises determining projected omnidirectional video metadata, wherein the projected omnidirectional video metadata comprises data regarding a projection format of the projected two-dimensional track, region-wise packing data, data indicative of a conversion between local coordinate axes and global coordinate axes, data indicative of a content coverage, or some combination thereof.

In some examples, the first track or the second track comprises a packed two-dimensional track, and determining the first metadata or the second metadata comprises determining region-wise packing metadata, wherein the region-wise packing metadata comprises data regarding a relationship between packed regions in the packed two-dimensional track and projected regions in the projected two-dimensional track.

In some examples, the first track comprises a sub-picture track, and determining the first metadata comprises determining two-dimensional spatial relationship data, wherein the two-dimensional spatial relationship data comprises data indicative of a position in a coordinate system, the coordinate system, an orientation of the coordinate system, or some combination thereof.

In some examples, decoding the multimedia data comprises performing, based on the first metadata, a second track derivation operation on multimedia content associated with the first track to generate the media data of the first track. The first track can be associated with a plurality of variant tracks, each variant track including multimedia data, and performing the track derivation operation can include performing the track derivation operation on the plurality of variant tracks to generate the media data of the first track.

In some examples, the method further comprises generating new metadata for the second track. Generating the new metadata can include generating one or more of metadata based on the track derivation operation, metadata indicative of coding information, or both.

In some examples, performing the first track derivation operation or second track derivation option comprises performing a track grid composition operation, comprising determining track grid composition metadata based on a first metadata source, determining blending metadata based on a second metadata source that is different from the first metadata source, and performing the track grid composition operation based on the track grid composition metadata and the blending metadata. Determining track grid composition metadata can include determining a dimension of an output grid composition, a number of rows for the grid composition, a number of columns for the grid composition, or some combination thereof, and determining blending metadata comprises determining track overlay composition metadata.

Some aspects relate to a method for encoding video data. The method can include encoding multimedia data comprising a hierarchical track structure comprising at least a first track and a second track, wherein the first track is at a first level in the hierarchical track structure, and the second track is at a second level in the hierarchical track structure above the first level of the first track. The method includes encoding first metadata within the first track and second metadata within the second track, such that the multimedia data can be decoded by performing, based on the first metadata and the second metadata, a track derivation operation on the media data associated with the first track to generate the media data of the second track such that the second track is a derived track of the first track.

In some examples, the first track or the second track comprises a spherical three-dimensional content track, and encoding the first metadata or the second metadata comprises encoding stereoscopic video track grouping metadata, wherein the stereoscopic video track grouping metadata comprises data indicative of whether the spherical content track is for a left or right view of a stereoscopic view.

In some examples, the first track or the second track comprises a projected two-dimensional track, and encoding the first metadata or the second metadata comprises encoding projected omnidirectional video metadata, wherein the projected omnidirectional video metadata comprises data regarding a projection format of the projected two-dimensional track, region-wise packing data, data indicative of a conversion between local coordinate axes and global coordinate axes, data indicative of a content coverage, or some combination thereof.

In some examples, the first track or the second track comprises a packed two-dimensional track, and encoding the first metadata or the second metadata comprises encoding region-wise packing metadata, wherein the region-wise packing metadata comprises data regarding a relationship between packed regions in the packed two-dimensional track and projected regions in the projected two-dimensional track.

In some examples, the first track comprises a sub-picture track, and encoding the first metadata comprises encoding two-dimensional spatial relationship data, wherein the two-dimensional spatial relationship data comprises data indicative of a position in a coordinate system, the coordinate system, an orientation of the coordinate system, or some combination thereof.

In some examples, the method further comprises encoding metadata for a track grid composition operation, comprising encoding a first metadata source comprising track grid composition metadata, and encoding a second metadata source that is different from the first metadata source, wherein the second metadata source comprises blending metadata.

In some embodiments, encoding track grid composition metadata comprises encoding a dimension of an output grid composition, a number of rows for the grid composition, a number of columns for the grid composition, or some combination thereof, and encoding blending metadata comprises encoding track overlay composition metadata.

Some embodiments relate to an apparatus configured to decode video data. The apparatus comprises a processor in communication with memory, the processor being configured to execute instructions stored in the memory that cause the processor to receive multimedia data comprising a hierarchical track structure comprising at least a first track and a second track, wherein the first track is at a first level in the hierarchical track structure, and the second track is at a second level in the hierarchical track structure above the first level of the first track. The instructions cause the processor to determine first metadata contained within the first track and second metadata contained within the second track, and decode the multimedia data, comprising performing, based on the first metadata and the second metadata, a track derivation operation on the media data associated with the first track to genera e the media data of the second track such that the second track is a derived track of the first track.

Some embodiments relate to an apparatus for encoding video data. The apparatus comprises a processor in communication with memory, the processor being configured to execute instructions stored in the memory that cause the processor to encode multimedia data comprising a hierarchical track structure comprising at least a first track and a second track, wherein the first track is at a first level in the hierarchical track structure, and the second track is at a second level in the hierarchical track structure above the first level of the first track. The instructions cause the processor to encode first metadata within the first track and second metadata within the second track, such that the multimedia data can be decoded by performing, based on the first metadata and the second metadata, a track derivation operation on the media data associated with the first track to generate the media data of the second track such that the second track is a derived track of the first track.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 10 shows exemplary syntaxes for grid compositions, according to some embodiments.

FIG. 12 shows an example of sub-picture composition box, which includes a sub-picture region box, according to some examples.

DETAILED DESCRIPTION OF INVENTION

Various techniques can be used to improve existing video coding technology. Some techniques leverage tracks in a track hierarchy to store metadata at appropriate levels in the hierarchy. Storing metadata in a manner that leverages a track hierarchy can significantly reduce the number of metadata boxes that are specified for each sub-picture, and improve picture processing (e.g., compared to techniques that store all such metadata at the sub-picture level). The techniques can avoid duplication of metadata declarations, saving significant byte count overhead. Some techniques separate composition process/information from the overlay and/or blending process/information. For example, the techniques can allow a decoding device to first compose tracks together, and then use a different transform to perform blending (e.g., a blending between a composed picture and background). These and other techniques are discussed further herein.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
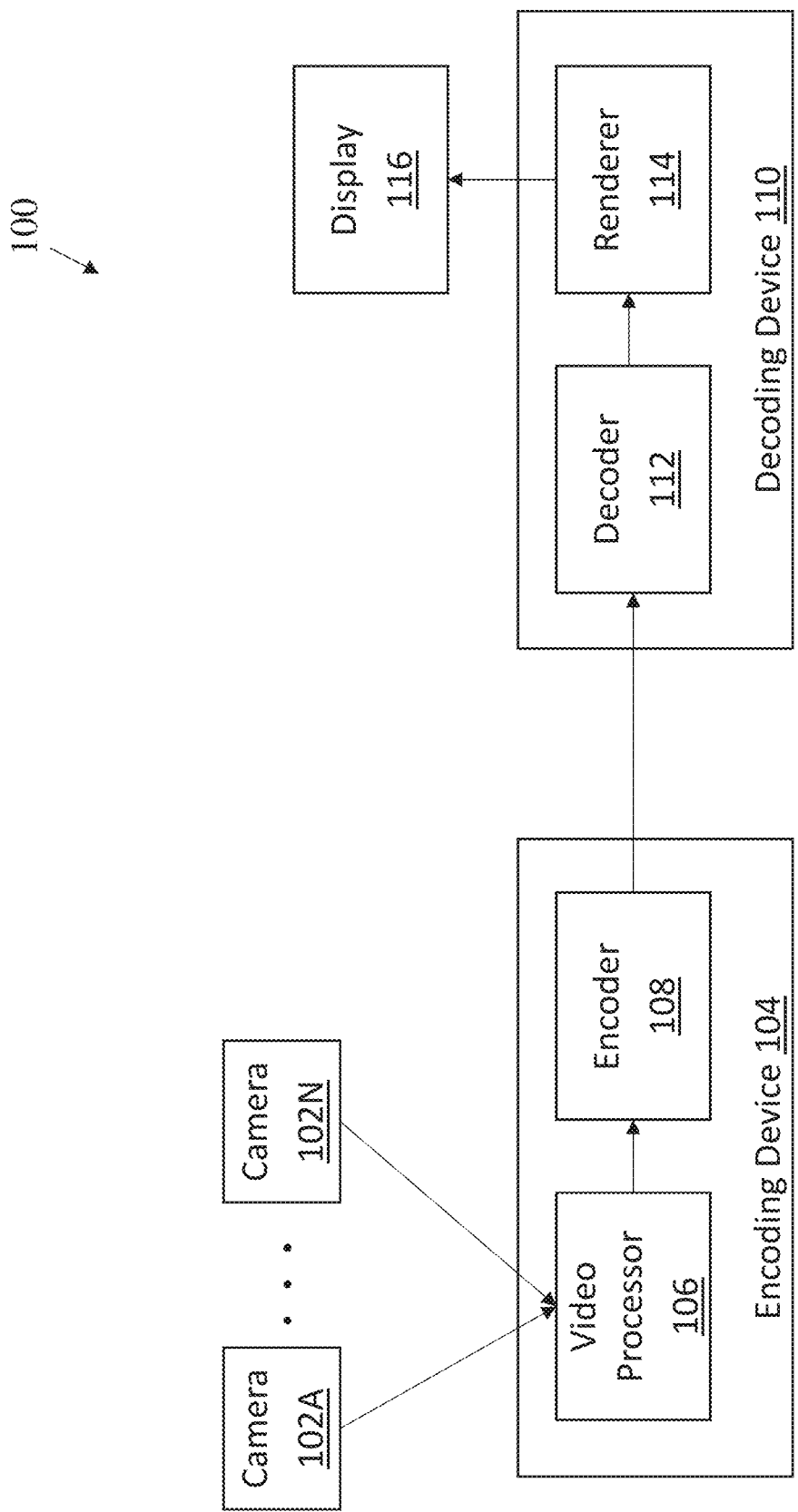
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a sphere. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
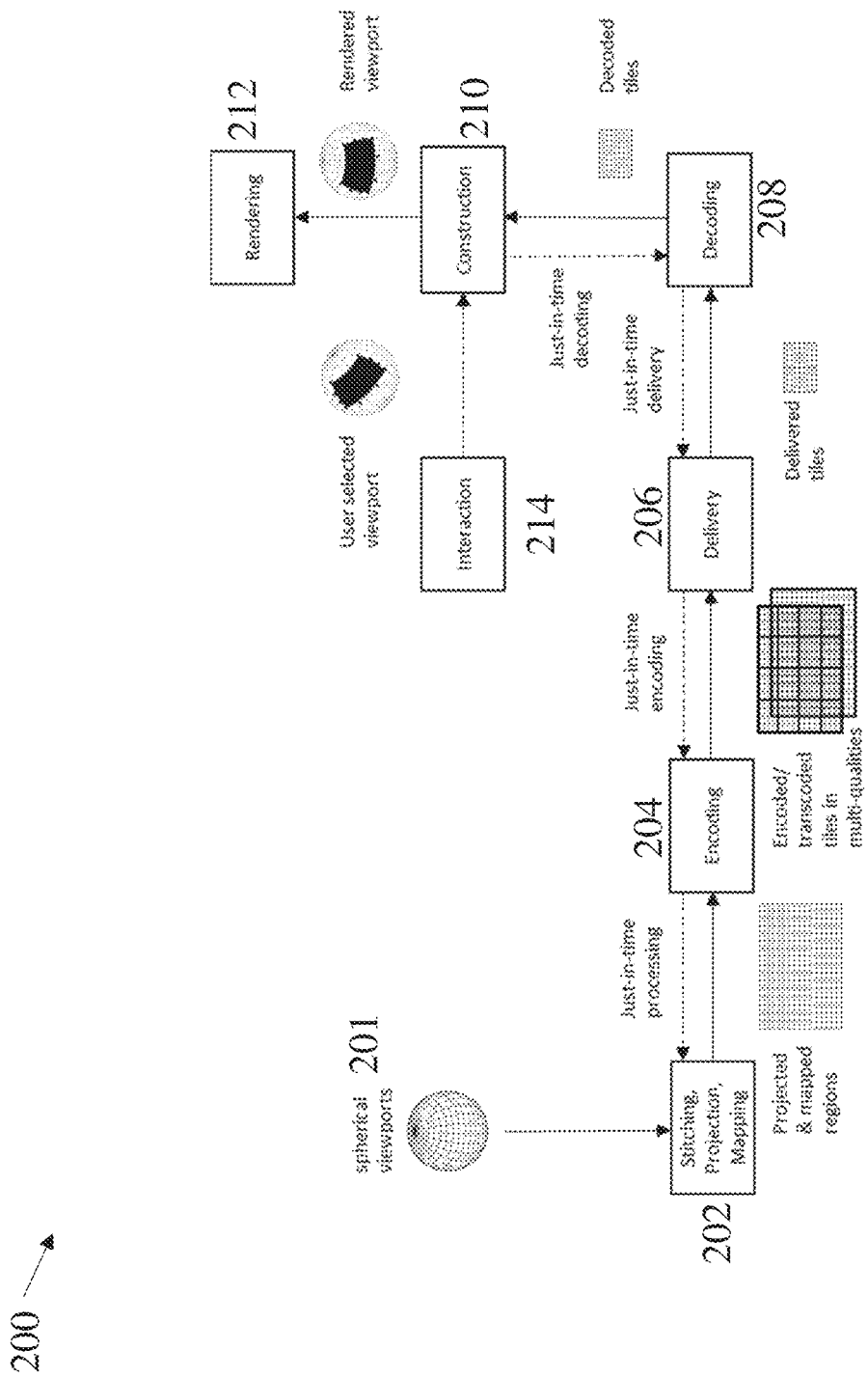
FIG. 2 a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
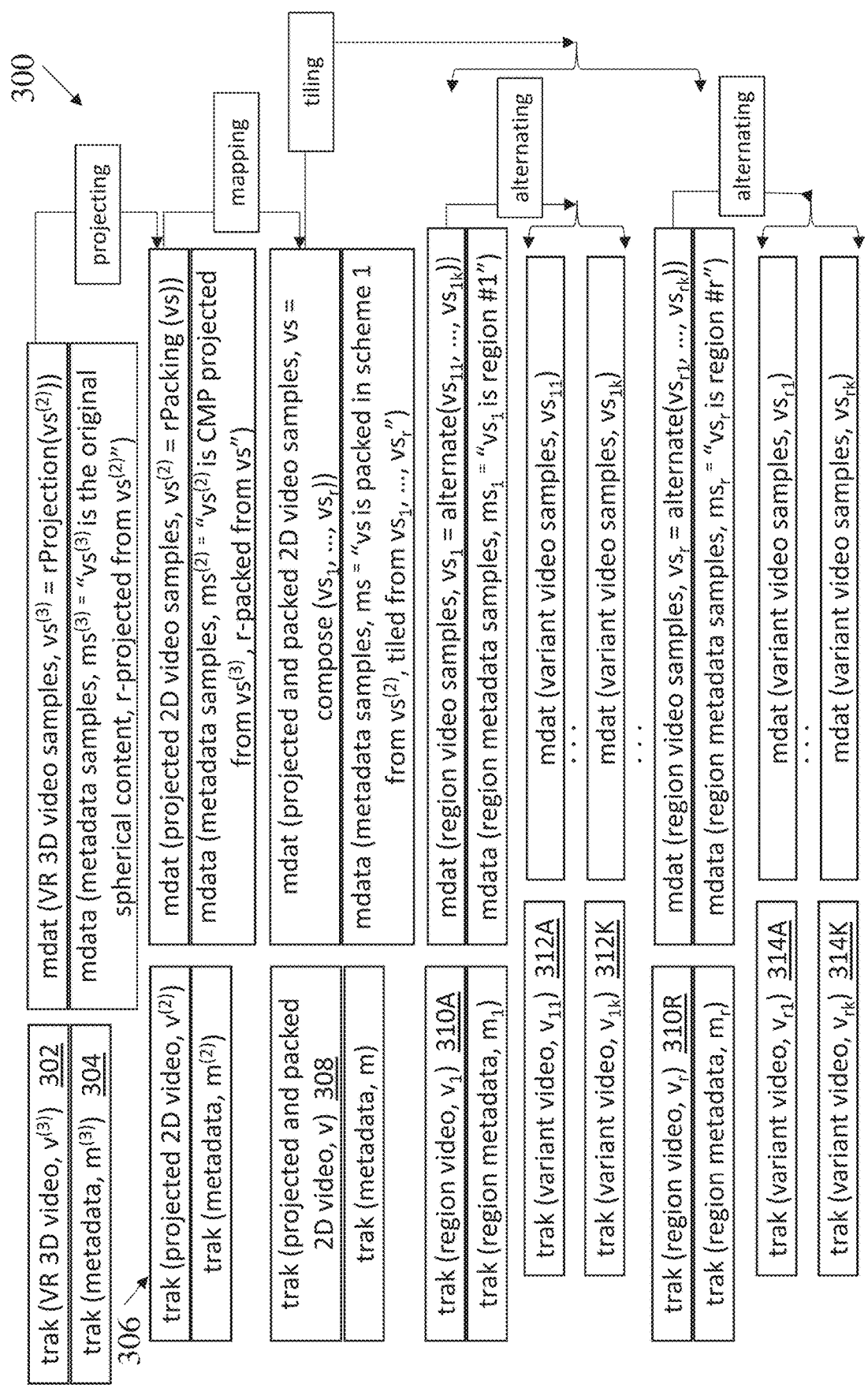
FIG. 3 shows an exemplary track hierarchical structure, according to some embodiments.

A flat file structure for the content could be used, for example, for a video track for a single movie. For VR content, there is more content than is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118th meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used, w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306.

Figure 4:
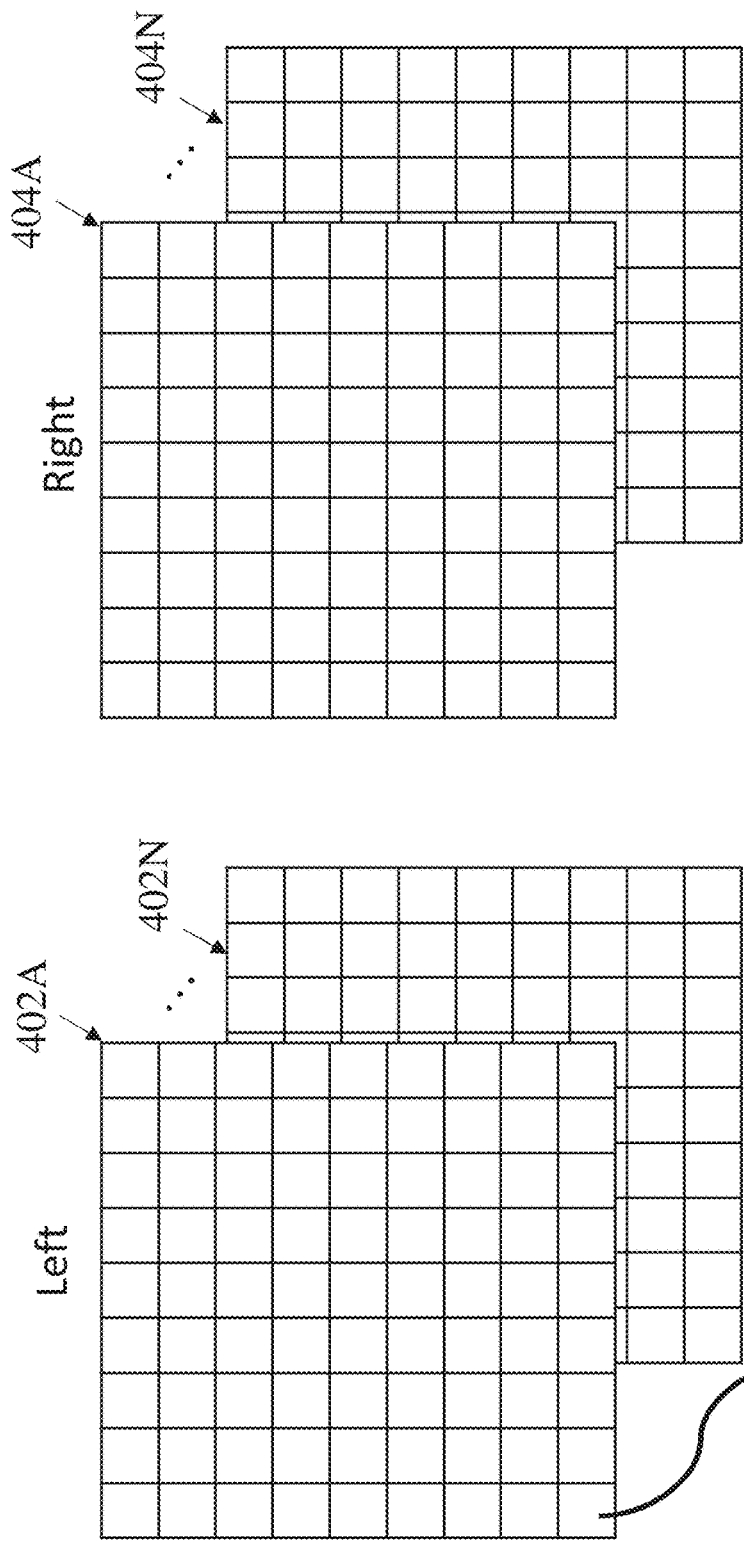
FIG. 4 shows sequences of left stereo pictures and right stereo pictures for stereoscopic video, according to some examples.

FIG. 4 shows sequences of left stereo pictures 402A-402N (collectively referred to as left stereo pictures 402) and right stereo pictures 404A-404N (collectively referred to as right stereo pictures 404) for stereoscopic video, according to some examples. Each picture 402, 404 in this example is divided into a nine by nine grid of sub-pictures. According to some techniques, metadata/attributes are specified for each sub-picture. For example, each sub-picture can include metadata to indicate its sub-picture track, data related to its projection, the larger picture of which it is a sub-picture, the quality of the sub-picture, and/or the like. The metadata can be specified in a metadata box. As shown in FIG. 4, the metadata can include a stereo video group metadata box StereoVideoGroupBox (ster) 410, a projected omnidirectional video metadata box ProjectedOmniVideoBox (povd) 412, a RegionWisePackingBox (rwpk) 414, a TwoDimensionalSpatialRelationship (2dcc) 416, and a VariantPictureBox (vpct) 418. These boxes are intended to be illustrative and not limiting, as other metadata boxes can be used as well.

Figure 5:
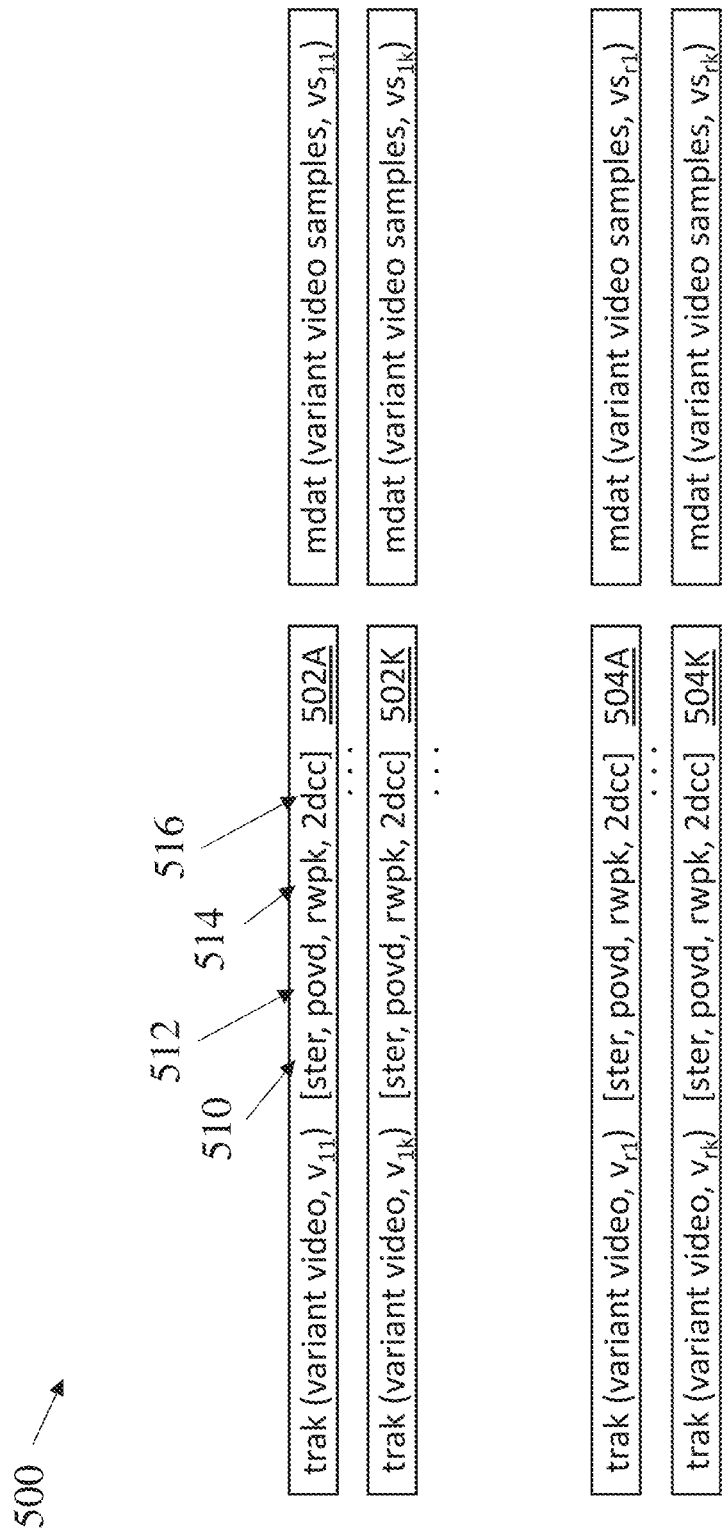
FIG. 5 shows exemplary metadata storage with variant tracks, according to some examples.

Some techniques store this metadata with each sub-picture in the sub-picture tracks (e.g., variant region tracks 312). FIG. 5 shows exemplary metadata storage with variant tracks, according to some examples. As discussed in conjunction with FIG. 3, each region track includes an associated set of variant tracks. As shown in FIG. 5, a first region track (not shown for simplicity) includes variant tracks 502A through 502K (collectively referred to as variant tracks 502). A second region track (also not shown) includes variant tracks 504A through 504K (collectively referred to as variant tracks 504). Each variant track 502, 504 stores metadata, including in this non-limiting example a StereoVideoGroupBox ster 510, a projected omnidirectional video metadata box ProjectedOmniVideoBox (povd) 512, a RegionWisePackingBox (rwpk) 514, and a TwoDimensionalSpatialRelationship (2dcc) 516.

The StereoVideoGroupBox (ster) 510 can specify attributes and/or metadata related to stereoscopic video track grouping. The ster 510 can include, for example, the syntax specified in OMAF for the StereoVideoGroupBox. For example, ster 510 can indicate whether the track is either the left or right view of a stereo pair suitable for playback on a stereoscopic display. For example, a Boolean can be used, where a 0 value indicates the right view of a stereo pair, and a 1 value indicates the left view of a stereo pair. In some embodiments, the tracks that have the same track group identifier form a stereo pair.

The ProjectedOmniVideoBox (povd) 512 can be used to specify attributes and/or metadata for restricted video schemes for omnidirectional video. The povd 512 can include, for example, the syntax specified in OMAF for the ProjectedOmniVideoBox. For example, povd 512 can indicate the projection format of the projected picture (e.g., C for monoscopic video contained in the track, CL and CR for left and right view of stereoscopic video, and/or the like), region-wise packing (e.g., when applicable), the rotation for conversion between the local coordinate axes and the global coordinate axes (e.g., if applied), the content coverage of the track, and/or the like. In some embodiments, the povd 512 box is referred to as the PROJ box.

The RegionWisePackingBox (rwpk) 514 can include attributes and/or metadata related to storage of omnidirectional images. The region-wise packing data can specify a mapping between packed regions and the corresponding projected regions, the location and size of the guard bands, if any, and/or the like. The rwpk 514 can include, for example, the syntax specified in OMAF for the RegionWisePackingBox. In some examples, the rwpk 514 includes a RegionWisePackingStruct, as also specified in OMAF. For example, the RegionWisePackingStruct can include data indicative of the width and height of the projected picture, the width and height of the packed picture, data for stereoscopic projected pictures, data for each of the projected regions and packed regions in both constituent pictures or to a projected region and the respective packed region (e.g., one or more of data indicating the presence of guard bands, the packing type, the mapping between a projected region and the respective packed region in the rectangular region packing structure, the guard bands, if any, etc.), and/or the like.

The TwoDimensionalSpatialRelationship (2dcc) 516 can specify attributes and/or metadata related to two dimensional relationships. For example, the metadata can indicate that the track belongs to a group of tracks with 2D spatial relationships (e.g., corresponding to planar spatial parts of a video source). The 2dcc 516 can specify a coordinate system (e.g., including a width and/or height), the source of the tracks, and/or the like. In some embodiments, the 2dcc box is referred to as the sub-picture composition box (SPCO) box.

The inventors have discovered and appreciated deficiencies with existing technology related to video coding, and in particular to storing metadata in sub-picture tracks. In particular, existing techniques require defining a significant number of metadata for each video, such as for stereo video. For example, if each picture is a nine by nine grid of sub-pictures as shown in FIG. 4, then for each left and right stereo pair there are 2×9×9×5 sub-pictures, or 810 sub-pictures total. If each sub-picture has five metadata boxes as shown in FIG. 5, then 810 sub-pictures×5 metadata boxes equals 4050 metadata boxes in total. Therefore, if each sub-picture carries all of these metadata boxes, such techniques can result in a significant number of metadata boxes being defined and stored for each stereo pair. The inventors have also appreciated that if all metadata is stored at the sub-picture level, it can be difficult to determine how each sub-picture track relates to other tracks. For example, if a decoder needs to process an entire picture, then the decoder may need to go through all of the tracks to figure out which variant tracks are the variant tracks of the same sub-picture, and so on.

The inventors have developed technical improvements to existing video coding technology to significantly reduce the number of metadata boxes that are specified for each sub-picture, and to improve picture processing. The inventors have discovered that when using a flat structure to specify the metadata at the sub-picture level (e.g., as shown in FIG. 5), various metadata can be redundant since it is common across some or all of the sub-pictures, such as each sub-picture may have the same projection format, the same packing format, the same quality among sub-pictures for a particular quality), and/or the like. The inventors have developed techniques to manage metadata that applies to the entire composition picture separately from metadata that applies to a sub-picture track alone. The techniques can avoid duplication of metadata declarations, saving significant byte count overhead (e.g., compared to prior techniques, as discussed in conjunction with FIG. 5). The techniques can maintain backward compatibility with parsers that ignore sub-picture composition signaling. For example, sub-picture composition signaling can be ignored by older parsers which do not recognize this signaling, such that the remaining signaling information is compatible with the older parsers.

The techniques can include leveraging a track hierarchy structure (e.g., the hierarchy discussed in conjunction with FIG. 3) to store metadata in the tracks at appropriate track hierarchy levels in derived media tracks. For example, as discussed further herein, rather than storing some metadata in each variant video track (e.g., as discussed in conjunction in FIG. 5), the metadata can be stored in the derived track. The techniques can associate, store, and signal sub-picture track related attributes and/or metadata to appropriate derived tracks in the hierarchy. The techniques can inherit other metadata stored in derived media tracks from the top of the hierarchy downwards, rather than storing metadata in each and every variant sub-picture track. The techniques can be consistent with the OMAF file decoding and rendering processes, with metadata being associated, stored and signaled in a much more appropriate, logical and efficient manner. For instance, projection and (region-wise) packing metadata boxes are stored into derived projected and packed picture tracks, rather than in each and every variant sub-picture track.

Figure 6:
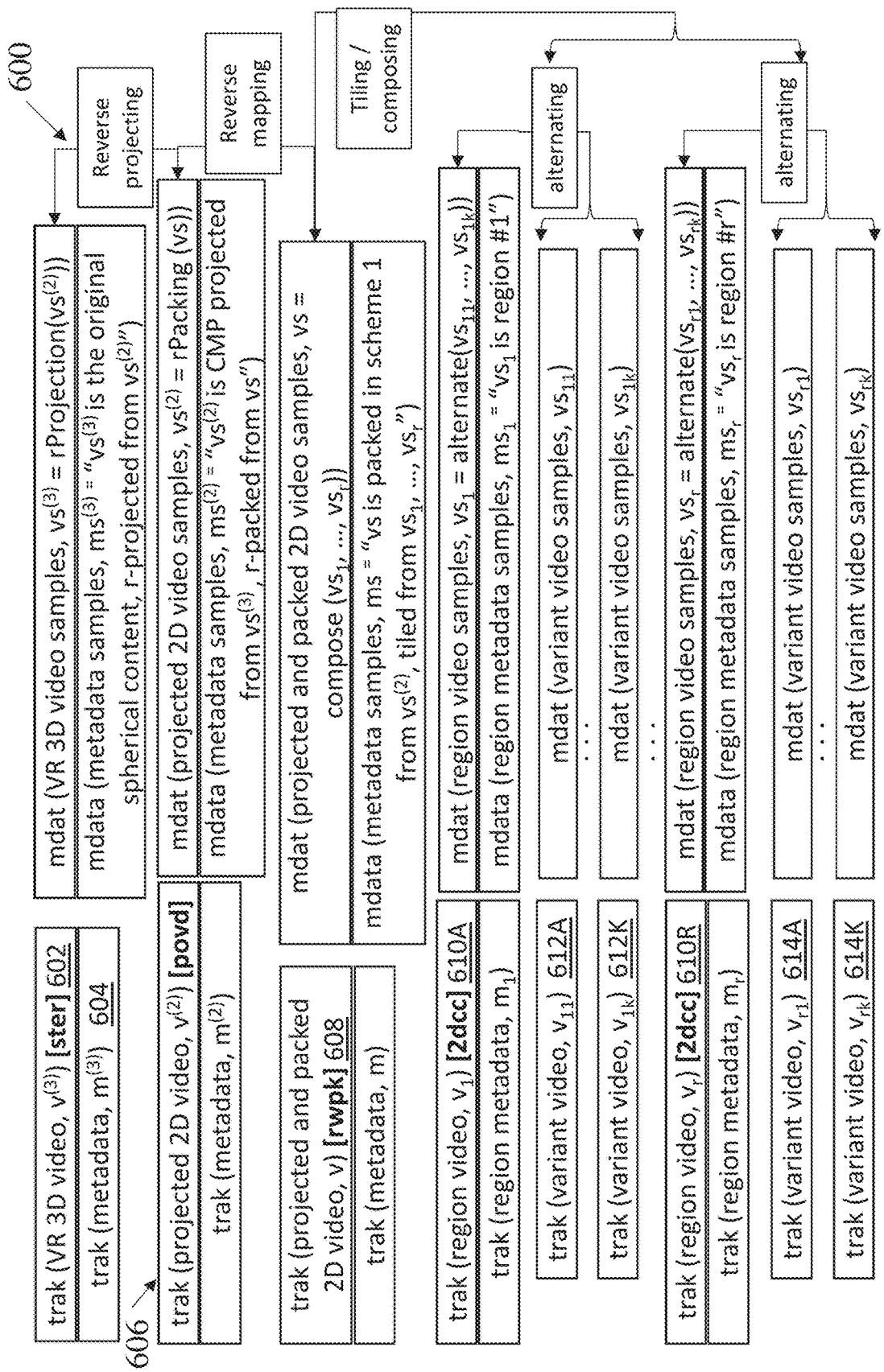
FIG. 6 shows an exemplary track hierarchical structure, according to some embodiments.

FIG. 6 shows an exemplary track hierarchical structure 600, according to some embodiments. The top track 602 is the 3D VR spherical content track, and below the top track 602 is the associated metadata track 604 (each track has associated metadata, as shown and discussed further below). The track 606 is the 2D projected track. The track 608 is the 2D big picture track. The region tracks are shown as tracks 610A through 610R, generally referred to as sub-picture tracks 610. Each region track 610 has a set of associated variant tracks. Region track 610A includes variant tracks 612A through 612K. Region track 610R includes variant tracks 614A through 614K. Thus, as shown by the track hierarchy structure 600, a structure can be developed that starts with physical multiple variant region tracks 612, and the track hierarchy can be established for region tracks 610 (sub-picture or tile tracks), projected and packed 2D tracks 608, projected 2D tracks 606, and VR 3D video tracks 602, with appropriate metadata tracks associated them.

Rather than specifying all attributes and/or metadata at the variant track level in the variant tracks (e.g., as shown in FIG. 5), FIG. 6 shows an encoding scheme where the attributes and/or metadata are specified in derived tracks at associated levels in the track hierarchy. In this non-limiting example, the 'ster' metadata box is provided in the VR 3D video tracks 602, the 'povd' metadata box is provided in the 2D tracks 606, the 'rwpk' metadata box is provided in the projected and packed 2D tracks 608, and the '2dcc' metadata box is provided in each of the tracks 610 (sub-picture or tile tracks). As shown in FIG. 6, the metadata stored in the derived tracks are separate and distinct from the timed metadata tracks 604. Unlike the metadata boxes specified in the derived tracks of the hierarchy, as discussed further herein, the timed metadata tracks 604 are file format tracks separate from the variant and derived tracks. The timed metadata tracks 604 are typically used for different purposes than metadata within the derived tracks. For example, unlike metadata that can be provided within metadata boxes within media tracks, the timed metadata tracks 604 can be used to provide metadata with timing information that can be synchronized with time-variant media data within the media tracks referenced by the timed metadata tracks. Such an external timed metadata track reference mechanism can, for example, make it possible to generate the media tracks and timed metadata tracks separately and provide a many-to-many (m-to-n) association relationship among the media and timed metadata tracks. For example, multiple spherical regions of interest can be specified as timed metadata for a number of derived spherical media content (e.g., according to editors cuts, end-users' popular choices, and/or the like).

Unlike the timed metadata tracks 604, the techniques described herein use metadata in metadata boxes within the derived tracks. As explained herein, derived tracks at the various levels of the hierarchy may not have media data, which is carried in the variant tracks. By including metadata boxes in the derived tracks in accordance with the techniques described herein, the metadata can be associated with the particular variant tracks associated with the derived track through the track hierarchy (e.g., even if the variant track itself does not carry the media data). The metadata in the derived tracks can specify metadata used for the track derivation operations (e.g., projecting, mapping, tiling, etc.). In contrast, the timed metadata is typically not used for derivation operations, and can be ignored entirely when performing derivation operations. Timed metadata also cannot be specified in a manner such that it can be associated with the underlying media data included in different tracks in the hierarchy.

As shown in FIG. 6, the hierarchical metadata storage can manage metadata (e.g., ProjectedOmniVideoBox and RegionWisePackingBox) that applies to the entire composition picture from metadata (e.g., TwoDimensionalSpatialRelationship and VariantPictureBox) that applies to a sub-picture track alone. The hierarchical metadata storage can avoid duplication of metadata declarations (e.g., ProjectedOmniVideoBox and RegionWisePackingBox) causing unnecessary byte count overhead. The hierarchical metadata storage can maintain backward compatibility with parsers ignoring sub-picture composition signaling (e.g., only VariantPictureBox is stored in tracks with media content, ignoring this signaling would be able to maintain the backward compatibility), and/or both.

In some embodiments, the VariantPictureBox 418 discussed in conjunction with FIG. 4 need not be included in the hierarchy. For example, a definition of a VariantPictureBox can be to use the Track Selection Box 'tsel', to label variant (sub-)picture tracks and signal them as an alternate group of tracks, so that individual tracks with a same group identifier and group type belong to a same group that is related to a particular subpicture track (e.g., as for example, tracks of a same piece of content but with different bitrates or qualities). In some embodiments, the VariantPictureBox can be included in the hierarchy (e.g., in the variant tracks). In some embodiments, a "FisheyeOmnidirectionalVideoBox" and/or "StereoVideoBox" can be included as metadata boxes of a track, for example, at level 3 for a (derived) fish eye picture or stereo video track (e.g., and stored in their corresponding derived tracks).

Figure 7:
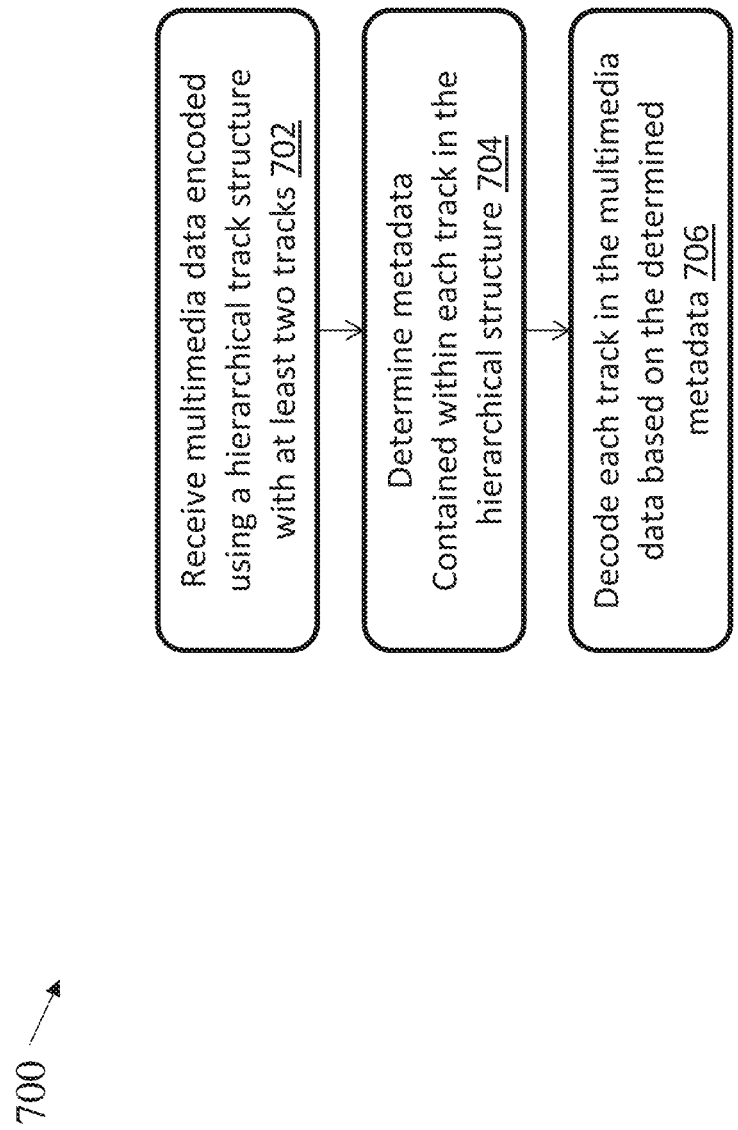
FIG. 7 shows an exemplary decoding method for decoding video data, according to some embodiments.

FIG. 7 shows an exemplary decoding method for decoding video data, according to some embodiments. At step 702, the decoding device (e.g., decoding device 110) receives multimedia data encoded using a hierarchical track structure (e.g., as shown in FIG. 6). The multimedia data includes two or more tracks (e.g., 2D projected track 606 and 2D big picture track 608), each track being at an associated level in the hierarchical track structure. For example, referring to FIG. 3, the first track, the 3D spherical content track 602, is at a first (e.g., top) level in the hierarchical track structure, and the second track, the 2D projected track 606, is at a second level in the hierarchical track structure above the first level of the first track. At step 704, the decoding device determines metadata contained within each track in the hierarchical structure. At step 706, the decoding device decodes the multimedia data by performing derivation operations on each track using the determined metadata. For example, if the multimedia data has two tracks, the decoding device performs, based on first metadata contained within a first track, a first track derivation operation on the first track to generate a first derived track, and performs, based on second metadata contained within the second track, a second track derivation operation on the first derived track to generate a second derived track.

In some embodiments, the decoding process can generate additional metadata for a derived track. For example, the metadata can be generated when performing a derivation operation for the track based on metadata and/or video content of a derived track that is lower in the hierarchy. In some embodiments, the metadata can include an entry comprising a flag or bit value. For example, the entry can indicate the media data of the derived track was generated (e.g., compared to the absence of the media data prior to the derivation). In some embodiments, the metadata can indicate time and/or date information. For example, the metadata can indicate the time and/or date when the media data derivation is accomplished. In some embodiments, the metadata can include other information regarding a derivation operation. For example, the metadata can include "alte" metadata, such as coding information from the chosen alternate track (e.g., metadata related to the image resolution, frame rate, etc. of the chosen alternate track). As another example, the metadata can include "2dcc" metadata, such as coding information from the sub-picture tracks (e.g., metadata related to a range of the image resolutions, frame rates, etc. from the sub-picture tracks). In some embodiments, the metadata can include "rwpk" metadata, such as coding information from the region-wise packed track (e.g., metadata related to the image resolution, frame rate, etc. from the region-wise packed track). The region-wise packed track can be, in some embodiments, the sub-picture composition track from a "2dcc" derivation. In some embodiments, the metadata can include "povd" metadata, such as coding information from the projected track (e.g., metadata related to the image resolution, frame rate, etc. of the projected track). In some embodiments, the metadata can include "ster" metadata, such as coding information from two (e.g., left and right) sphere tracks (e.g., metadata related to a range of the image resolutions, frame rates, etc. from the two sphere tracks). These and other examples of such metadata are described in ISO/IEC 14496-12, Information Technology—Coding of Audio-Visual Objects, Part 12: ISO Base Media File Format (ISOBMFF), 5$^{th}$ Ed., Feb. 20, 2015, which is hereby incorporated by reference herein in its entirety. ISOBMFF describes various metadata boxes and attributes for metadata (e.g., generic metadata) for any (e.g., regular as well as derived) samples of video tracks. See, e.g., ISOBMFF, Table 1.

Figure 8:
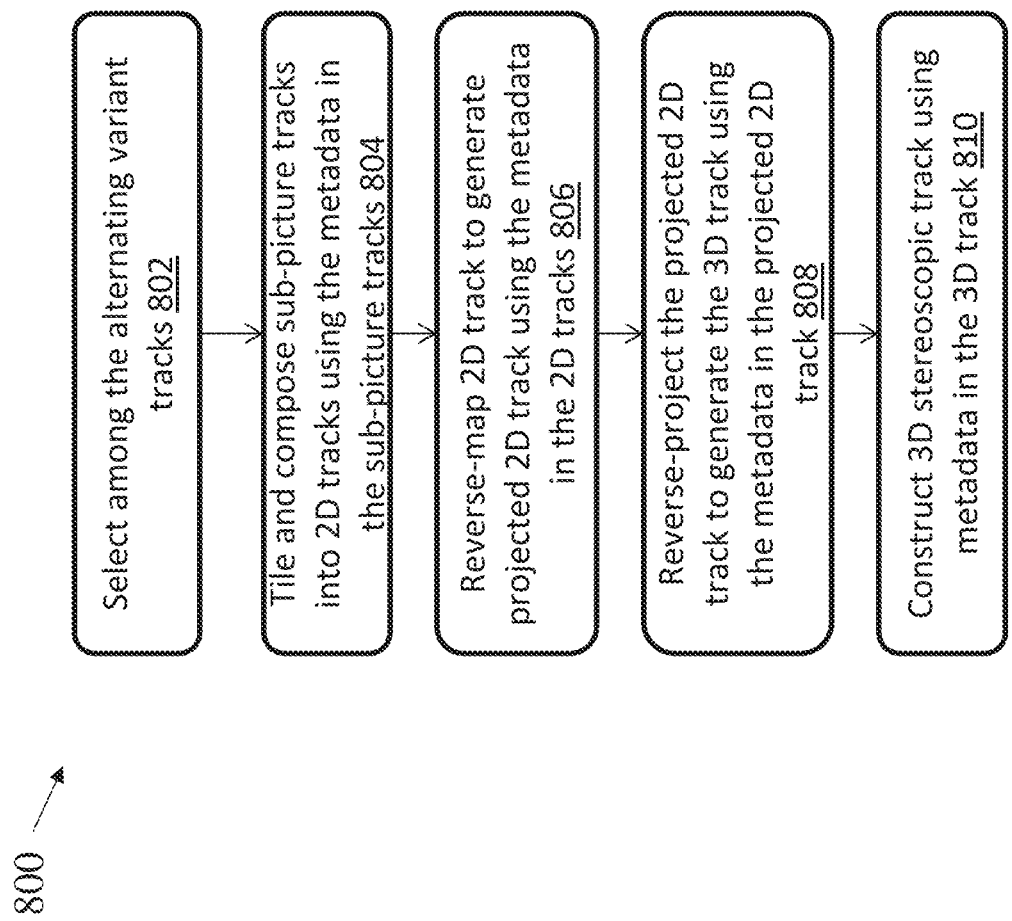
FIG. 8 shows an exemplary decoding process, according to some embodiments.

FIG. 8 shows an exemplary decoding process 800, according to some embodiments. As discussed herein, the variant tracks include the actual picture data. Referring to FIG. 6, at step 802, the decoding device initially selects among the alternating variant tracks to pick the one that is representative of the sub-picture region (or sub-picture track) 610. In some embodiments, the decoding device can use metadata included in each variant track, such as the vpct box 418 discussed in FIG. 4. In some embodiments, the decoding device can select a variant track using the alternate_group value instead of a metadata box. For example, in the file format stack, each track can include an indication of an alternate group to which the track belongs. For example, if the is two, the alternate group indicates that the track belong to the second alternate group. The decoder can use the alternate group indication to only select content from one group. Using the alternate group can reduce the amount of metadata need for each variant track (e.g., variant sub-picture metadata, such as vpct 418, that may otherwise be included in each variant track). The selected variant track is the representative sub-picture track.

At step 804, the decoding device tiles and composes together the sub-picture tracks 610 into the 2D big picture track 608 using the metadata in the sub-picture track 610 (e.g., the 2dcc box). The decoder can use the metadata carried in the sub-picture track to determine two-dimensional spatial relationship data, such as data indicative of a position in a coordinate system, the coordinate system, an orientation of the coordinate system, and/or the like. At step 806, the decoding reverse-maps the 2D track 608, e.g., to rearrange some of the portions, to generate the projected 2D track 606 using metadata in the 2D track 608 (e.g., the rwpk box). The decoder can use the metadata to determine region-wise packing metadata, such as data regarding a relationship between packed regions in the packed two-dimensional track and projected regions in the projected two-dimensional track.

At step 808, the decoder reverse-projects the 2D projected track 606 back to the 3D track 602, which is the original 3D picture, using metadata in the 2D projected track 606 (e.g., a povd box). The decoder can determine projected omnidirectional video metadata, which can include data regarding a projection format of the projected two-dimensional track, region-wise packing data, data indicative of a conversion between local coordinate axes and global coordinate axes, data indicative of a content coverage, and/or the like. At step 810, the decoder constructs a 3D stereoscopic track using the metadata in the 3D track 602 (e.g., the ster box). The decoder can determine stereoscopic video track grouping metadata, which can include data indicative of whether the spherical content track is for a left or right view of a stereoscopic view.

As shown in FIG. 8, metadata is inherited as the decoding process progresses through the track hierarchy. For example, as shown in FIG. 6, the spco box is specified for each sub-picture track, and the rwpk box, proj box, and ster box are inherited through the inclusion in associated derived tracks in the hierarchy. The inherited metadata can be specified in a much more efficient manner using such inheritance, such that a metadata savings can be appreciated, decoding processing can be made more efficient (e.g., since the metadata is specified at the necessary derived track), and/or the like. For example, the hierarchy can be used to determine metadata and/or attributes from the top-down, whereas with a flat file system the metadata and/or attributes could not be determined on a level-by-level basis. As an illustrative example, if a device requests a particular viewport, the encoding device 104 can use the viewport to map to the 2D projected track, then to the 2D region-wise track, and then determine where the viewport is in the sub-picture tracks, and ultimately get the content from the associated variant tracks. With a flat structure, there is no organization of the variant tracks, and therefore the encoding device would need to search all tracks, which is inefficient compared to leveraging the track hierarchy techniques discussed herein.

Figure 9:
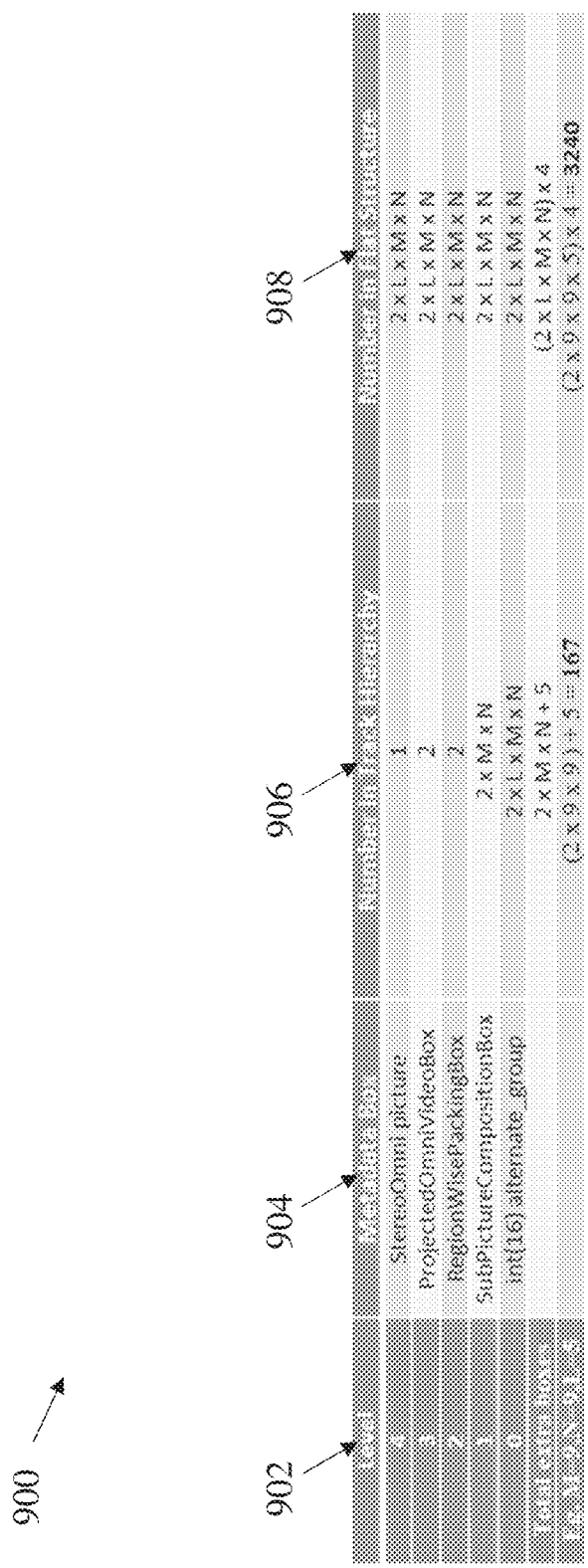
FIG. 9 is a table showing metadata usage when the metadata is included in derived tracks compared to techniques that include the metadata in the variant tracks, according to some embodiments.

FIG. 9 is a table 900 showing metadata usage when the metadata is included in derived tracks compared to techniques that include the metadata in the variant tracks, according to some embodiments. Column 902 shows the levels of the hierarchy, where level 4 refers to the 3D spherical content track, level 3 refers to the 2D projected track, and so on. Column 904 shows an example of metadata, such as the StereoOmni picture box (ster box), and so on, as discussed herein. Column 906 shows the number of each metadata box in column 904 for the level 902 in the hierarchy, when the metadata is included in the derived tracks as described herein. Column 908 shows the number of each metadata box in column 904 for the level 902 when the metadata is included in the variant tracks. As a generalization, M×N represents the dimensions of the grid of sub-pictures for each picture (e.g., as discussed in conjunction with FIG. 4). L represents the number of different variant tracks. As shown in column 906, for an example where M and N are 9 and L is 5, total number of the metadata boxes in column 904 when distributing them among the various levels of the hierarchy are 167. As shown in column 908, when using a flat structure that defines all of the metadata boxes in column 904 at the variant track level, the total number of metadata boxes is much larger at 3,240 total boxes.

The inventors have further discovered and appreciated deficiencies with existing techniques for specifying blending, such as techniques used to blend input tracks with a background. For example, existing techniques may require specifying overlay and/or blending information (e.g., a background image, a background video, a blending mode, and/or the like) with the sub-picture track composition information. Such techniques can result in repeated instances of overlay and/or blending information in the composition information.

The inventors have developed techniques to separate the composition process/information from the overlay and/or blending process/information. For example, the techniques can be used so that a decoding device can first compose tracks together, and then use a different transform to perform blending (e.g., a blending between a composed picture and background). So for a composition track derivation, the decoding device can focus just on the composition first, and then the overlay and/or blending. The techniques can be used, for example, in conjunction with techniques described in OMAF when considering composition of sub-picture tracks for the viewport dependent media processing. When needed, background blending can be achieved by applying, for example, the track overlay composition in Section 2.7, "Track Overlay Composition", to the derived composed track.

The techniques described herein provide for track grid composition options, such as where there is no track overlay for input tracks, to separate background blending from track composition. For example, if using a grid, the techniques can be used to specify where each sub-picture is in the grid. FIG. 10 shows exemplary syntaxes for grid compositions, according to some embodiments.

The Track Grid Composition syntax 1000 simplifies track grid composition information, e.g., compared to previous track grid composition techniques. The syntax 1000 for the Track Grid Composition (tgcp) can specify a derived track, each of whose samples is a composition of sample images of one or more input tracks in a given grid order. The flag can be used to specify the length of the fields output_width and output_height. For example, if (flags & 1) is equal to 0, it specifies that the length of the fields output_width and output_height is 16 bits, whereas if (flags & 1) equal to 1, it specifies that the length of the fields output_width and output_height is 32 bits. The fields output_width 1004 and the output_height 1006 specify the width and height, respectively, of the reconstructed image on which the input images are placed. The fields rows_minus_one 1008 and columns-_minus_one 1010 specify the number of rows of sample images of the input visual tracks, and the number of sample images of the input visual tracks per row; the value is one less than the number of rows or columns respectively. As shown, the Track Grid Composition has a limited set of fields, and does not specify any overlay and/or blending information (e.g., a background image, a background video, a blending mode, and/or the like) with the sub-picture track composition information.

The sample images of the input visual tracks can be inserted in row-major order, top-row first, left to right, in the order they are listed as the input tracks. The value of num_input can be equal to rows*columns. The sample images (e.g., possibly after being resized) can have the same width and height. The input sample images, when composed together, can completely "cover" the derived sample image according to the grid, where width*columns is equal to output_width and height*rows is equal to output_height. In other words, the derived sample image can be formed by tiling the input sample images into a grid with a column width and a row height, without any gap or overlap.

The Track Grid Matrix Composition syntax 1030 and Track Grid Subpicture Composition 1060 specify fewer fields than the Track Grid Composition syntax 1000. As discussed further herein, the Track Grid Matrix Composition syntax 1030 uses the track composition information from the matrix values in the input track headers, and the Track Grid Subpicture Composition 1060 uses the track composition information from the sub-picture composition metadata.

The Track Grid Matrix Composition 1030 takes visual tracks as input entities. The Track Grid Matrix Composition 1030 can specify a derived track, each of whose samples is a composition of sample images of one or more input tracks in a given grid order. Track Grid Matrix Composition syntax 1030 includes the fields rows_minus_one 1032 and rows_plus_one 1034, which specify the number of rows of sample images of the input visual tracks, and the number of sample images of the input visual tracks per row; the value is one less than the number of rows or columns respectively.

Similar to the Track Grid Composition 1000, for the Track Grid Matrix Composition 1030, the sample images of the input visual tracks can inserted in row-major order, top-row first, left to right, in the order they are listed as the input tracks. The value of num_input can be equal to rows*columns. After being applied, the sample images can have the same width and height. The input sample images, when composed together, can cover the derived sample image according to the grid, where width*columns is equal to output_width and height*rows is equal to output_height.

Figure 11:
FIG. 11 shows an exemplary transformation matrix, according to some examples.

For the Track Grid Matrix Composition 1030, the sample images are applied with the respective transformations specified by the matrix values in their track headers. The matrix values that occur in the headers specify a transformation of video images for presentation. FIG. 11 shows an exemplary transformation matrix 1100, according to some examples. The point (p, q) can transformed into (p', q') using the matrix 1100. The values in the matrix 1100 are stored in the order {a,b,u, c,d,v, x,y,w}. The matrix 1100 is multiplied by (p, q, 1) to calculate (m, n, z), where m=ap+cq+x; n=bp+dq+y; and z=up+vq+w. Then (m, n, z) can be used to calculate (p', q') by calculating p'=m/z; q'=n/z.

The coordinates (p, q) are on the decompressed frame, and (p', q') are at the rendering output. Therefore, for example, the matrix {2,0,0, 0,2,0, 0,0,1} exactly doubles the pixel dimension of an image. The co-ordinates transformed by the matrix are often not normalized, and represent actual sample locations. Therefore (x, y) can, for example, be considered a translation vector for the image. The co-ordinate origin can be located at the upper left corner, and X values increase to the right, and Y values increase downwards. The points (p, q) and (p', q') can be taken as absolute pixel locations relative to the upper left hand corner of the original image (e.g., after scaling to the size determined by the track header's width and height) and the transformed (e.g., rendering) surface, respectively. Each track can be composed using its matrix as specified into an overall image. The composed image can then be transformed and composed according to the matrix at the movie level in the MovieHeaderBox. In some embodiments, it can be application-dependent whether the resulting image is 'clipped' to eliminate pixels (e.g., pixels which have no display) to a vertical rectangular region within a window. For example, if only one video track is displayed and it has a translation to {20, 30}, and a unity matrix is in the MovieHeaderBox, an application may choose not to display the empty "L" shaped region between the image and the origin.

The Track Grid Subpicture Composition syntax 1060 can take as input visual tracks belonging to a sub-picture composition track group. The sub-picture composition track group can be specified, for example, in w17279, entitled "Technology under Consideration on sub-picture composition track grouping for OMAF," 120$^{th}$ MPEG Meeting, October 2017 (Macau, China), which is hereby incorporated by reference herein in its entirety. The Track Grid Subpicture Composition syntax 1060 can specify a derived track, each of whose samples is a composition of sample images of one or more input tracks in a given grid order.

Track Grid Subpicture Composition syntax 1060 includes the fields rows_minus_one 1062 and rows_plus_one 1064, which specify the number of rows of sample images of the input visual tracks, and the number of sample images of the input visual tracks per row; the value is one less than the number of rows or columns respectively.

Similar to the previous syntaxes, the sample images of the input visual tracks are inserted in row-major order, top-row first, left to right, in the order they are listed as the input tracks. The value of num_input shall be equal to rows*columns. The input sample images, when composed together, can completely "cover" the derived sample image according to the grid, where track_width*columns is equal to composition_width and track_height*rows is equal to composition_height.

For the Track Grid Subpicture Composition syntax 1060, the sample images can have the same width and height, track_width and track_height, as specified by sub picture region metadata, such as the SubPictureCompositionBox and/or SubPictureRegionBox. FIG. 12 shows an example of a SubPictureCompositionBox 1200, which includes a SubPictureRegionBox 1250, according to some examples. The TrackGroupTypeBox 1202 with track_group_type equal to 'spco' indicates that this track belongs to a composition of tracks that can be spatially arranged to obtain composition pictures. The visual tracks mapped to this grouping (e.g., the visual tracks that have the same value of track_group_id within TrackGroupTypeBox with track_group_type equal to 'spco') collectively represent visual content that can be presented. In some embodiments, each individual visual track mapped to this grouping may (or may not) be intended to be presented alone without other visual tracks, while composition pictures are suitable to be presented.

Referring to the SubPictureRegionBox 1250, track_x 1252 can specify, in luma sample units, the horizontal position of the top-left corner of the samples of this track on the composition picture. The value of track_x 1252 can be in, for example, the range of 0 to composition_width−1, inclusive. Track_y 1254 can specify, in lama sample units, the vertical position of the top-left corner of the samples of this track on the composition picture. The value of track_y 1254 can be in the range of 0 to composition_height−1, inclusive. The track_width 1256 can specify, in luma sample units, the width of the samples of this track on the composition picture. The value of track_width 1256 can be in the range of 1 to composition_width−1, inclusive. Track_height 1258 can specify, in luma sample units, the height of the samples of this track on the composition picture. The value of track_height 1258 can be in the range of 1 to composition_height−1, inclusive. Composition_width 1260 can specify, in luma sample units, the width of the composition picture. The value of composition_width 1260 can be the same in the instances of a SubPictureCompositionBox with the same value of track_group_id. Composition_height 1262 can specify, in luma sample units, the height of the composition picture. The value of composition_height 1262 can be the same in instances of SubPictureCompositionBox with the same value of track_group_id. The rectangle represented by track_x 1252, track_y 1254, track_width 1256, and track_height 1258 can be referred to as the sub-picture rectangle of this track.

For tracks belonging to the same sub-picture composition track group and belonging to the same alternate group (e.g., having the same non-zero alternate_group value), the position and size of the sub-picture rectangles can be the same. In some examples, the composition picture of a sub-picture composition track group can be derived by, out of all tracks belonging to the sub-picture composition track group, selecting one track from each alternate group. For each of the selected tracks, for each value of i in the range of 0 to track_width−1, inclusive, and for each value of j in the range of 0 to track_height−1, inclusive, the luma sample of the composition picture at luma sample position ((i+track_x) % composition_width, (j+track_y) % composition_height) is set equal to the luma sample of the sub-picture of this track at luma sample position (i, j). For each of the selected tracks, when the decoded picture has a chroma format other than 4:0:0, the chroma components are derived accordingly.

In some embodiments, the sub-picture rectangles of tracks belonging to the same sub-picture composition track group and belonging to different alternate groups (e.g., having alternate_group equal to 0 or different alternate_group values) shall not overlap and shall not have gaps, such that in the above derivation process for the composition picture each luma sample position (x, y), where x is in the range of 0 to composition_width−1, inclusive, and y is in the range of 0 to composition_height−1, inclusive, is traversed once.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
   receiving multimedia data comprising a hierarchical track structure comprising at least a first track, a second track, and a third track, wherein:
      the first track is at a first level in the hierarchical track structure and comprises first media data;
      the second track is at a second level in the hierarchical track structure above the first level of the first track; and
      the third track is at a third level in the hierarchical track structure above the first level of the first track and the second level of the second track;
   determining first metadata contained within the first track and second metadata contained within the second track, wherein the first metadata is different than the second metadata, and the second metadata comprises information associated with the first media data of the first track;
   determining third metadata contained within the third track, wherein the third metadata is different than the first metadata and the second metadata, and the third metadata comprises information associated with second media of the second track; and
   decoding the multimedia data, comprising:
      performing, based on the first metadata and the second metadata, a track derivation operation on the first media data of the first track to generate the second media data of the second track, such that the second track is a derived track of the first track and the second track comprises the second media data, wherein prior to performing the track derivation operation the second track did not comprise media data; and
      performing, based on the second metadata and the third metadata, a second track derivation operation on the generated second media data of the second track to generate three-dimensional (3D) multimedia data of the third track, such that the third track is a derived track of the second track and the third track comprises the generated 3D multimedia data, wherein prior to performing the second track derivation operation the third track did not comprise media data.

2. The decoding method of claim 1, wherein:
   the first track or the second track comprises a spherical three-dimensional content track; and
   determining the first metadata or the second metadata comprises determining stereoscopic video track grouping metadata, wherein the stereoscopic video track grouping metadata comprises data indicative of whether the spherical three-dimensional content track is for a left or right view of a stereoscopic view.

3. The decoding method of claim 1, wherein:
   the first track or the second track comprises a projected two-dimensional track; and
   determining the first metadata or the second metadata comprises determining projected omnidirectional video metadata, wherein the projected omnidirectional video metadata comprises data regarding a projection format of the projected two-dimensional track, region-wise packing data, data indicative of a conversion between local coordinate axes and global coordinate axes, data indicative of a content coverage, or some combination thereof.

4. The decoding method of claim 1, wherein:
   the first track or the second track comprises a packed two-dimensional track; and
   determining the first metadata or the second metadata comprises determining region-wise packing metadata, wherein the region-wise packing metadata comprises data regarding a relationship between packed regions in the packed two-dimensional track and projected regions in a projected two-dimensional track.

5. The decoding method of claim 1, wherein:
   the first track comprises a sub-picture track; and
   determining the first metadata comprises determining two-dimensional spatial relationship data, wherein the two-dimensional spatial relationship data comprises data indicative of a position in a coordinate system, the coordinate system, an orientation of the coordinate system, or some combination thereof.

6. The decoding method of claim 1, wherein decoding the multimedia data comprises performing, based on the first metadata, a third track derivation operation on multimedia content associated with the first track to generate the first media data of the first track.

7. The decoding method of claim 6, wherein:
   the first track is associated with a plurality of variant tracks, each variant track including multimedia data; and
   performing the track derivation operation comprises performing the track derivation operation on the plurality of variant tracks to generate the first media data of the first track.

8. The decoding method of claim 1, further comprising generating new metadata for the second track.

9. The method of claim 8, wherein generating the new metadata comprises generating one or more of:
   metadata based on the track derivation operation;
   metadata indicative of coding information; or both.

10. The decoding method of claim 1, wherein:
    performing the track derivation operation or second track derivation operation comprises performing a track grid composition operation, comprising:
       determining track grid composition metadata based on a first metadata source;
       determining blending metadata based on a second metadata source that is different from the first metadata source; and
       performing the track grid composition operation based on the track grid composition metadata and the blending metadata.

11. The method of claim 10, wherein:
    determining track grid composition metadata comprises determining a dimension of an output grid composition, a number of rows for the output grid composition, a number of columns for the output grid composition, or some combination thereof;
determining blending metadata comprises determining track overlay composition metadata.

12. The decoding method of claim 1, wherein:
performing the track derivation operation or the second track derivation operation comprises performing a track grid composition operation based on:
track grid composition metadata comprising a dimension of an output grid composition, a number of rows for the output grid composition, a number of columns for the output grid composition, or some combination thereof; and
blending metadata comprising track overlay composition metadata.

13. A method for encoding video data, the method comprising:
encoding multimedia data comprising a hierarchical track structure comprising at least a first track, a second track, and a third track, wherein:
the first track is at a first level in the hierarchical track structure and comprises first media data;
the second track is at a second level in the hierarchical track structure above the first level of the first track; and
the third track is at a third level in the hierarchical track structure above the first level of the first track and the second level of the second track;
encoding first metadata within the first track and second metadata within the second track, wherein the first metadata is different than the second metadata, and the second metadata comprises information associated with the first media data of the first track; and
encoding third metadata within the third track, wherein the third metadata is different than the first metadata and the second metadata, and the third metadata comprises information associated with second media data that will be generated for the second track,
such that the multimedia data can be decoded by:
performing, based on the first metadata and the second metadata, a track derivation operation on the first media data of the first track to generate the second media data of the second track, such that the second track is a derived track of the first track and the second track comprises the second media data, wherein prior to performing the track derivation operation the second track did not comprise media data; and
performing, based on the second metadata and the third metadata, a second track derivation operation on the generated second media data of the second track to generate three-dimensional (3D) multimedia data of the third track, such that the third track is a derived track of the second track and the third track comprises the generated 3D multimedia data, wherein prior to performing the second track derivation operation the third track did not comprise media data.

14. The encoding method of claim 13, wherein:
the first track or the second track comprises a spherical three-dimensional content track; and
encoding the first metadata or the second metadata comprises encoding stereoscopic video track grouping metadata, wherein the stereoscopic video track grouping metadata comprises data indicative of whether the spherical three-dimensional content track is for a left or right view of a stereoscopic view.

15. The encoding method of claim 13, wherein:
the first track or the second track comprises a projected two-dimensional track; and
encoding the first metadata or the second metadata comprises encoding projected omnidirectional video metadata, wherein the projected omnidirectional video metadata comprises data regarding a projection format of the projected two-dimensional track, region-wise packing data, data indicative of a conversion between local coordinate axes and global coordinate axes, data indicative of a content coverage, or some combination thereof.

16. The encoding method of claim 13, wherein:
the first track or the second track comprises a packed two-dimensional track; and
encoding the first metadata or the second metadata comprises encoding region-wise packing metadata, wherein the region-wise packing metadata comprises data regarding a relationship between packed regions in the packed two-dimensional track and projected regions in a projected two-dimensional track.

17. The encoding method of claim 13, wherein:
the first track comprises a sub-picture track; and
encoding the first metadata comprises encoding two-dimensional spatial relationship data, wherein the two-dimensional spatial relationship data comprises data indicative of a position in a coordinate system, the coordinate system, an orientation of the coordinate system, or some combination thereof.

18. The encoding method of claim 13, further comprising encoding metadata for a track grid composition operation, comprising:
encoding a first metadata source comprising track grid composition metadata; and
encoding a second metadata source that is different from the first metadata source, wherein the second metadata source comprises blending metadata.

19. The encoding method of claim 18, wherein:
encoding track grid composition metadata comprises encoding a dimension of an output grid composition, a number of rows for the output grid composition, a number of columns for the output grid composition, or some combination thereof;
encoding blending metadata comprises encoding track overlay composition metadata.

20. An apparatus configured to decode video data, the apparatus comprising a processor in communication with memory, the processor being configured to execute instructions stored in the memory that cause the processor to:
receive multimedia data comprising a hierarchical track structure comprising at least a first track, a second track, and a third track, wherein:
the first track is at a first level in the hierarchical track structure and comprises first media data;
the second track is at a second level in the hierarchical track structure above the first level of the first track; and
the third track is at a third level in the hierarchical track structure above the first level of the first track and the second level of the second track;
determine first metadata contained within the first track and second metadata contained within the second track, wherein the first metadata is different than the second metadata, and the second metadata comprises information associated with the first media data of the first track;

determine third metadata contained within the third track, wherein the third metadata is different than the first metadata and the second metadata, and the third metadata comprises information associated with second media data of the second track; and decode the multimedia data, comprising:
performing, based on the first metadata and the second metadata, a track derivation operation on the first media data of the first track to generate the second media data of the second track, such that the second track is a derived track of the first track and the second track comprises the second media data, wherein prior to performing the track derivation operation the second track did not comprise media data; and performing, based on the second metadata and the third metadata, a second track derivation operation on the generated second media data of the second track to generate three-dimensional (3D) multimedia data of the third track, such that the third track is a derived track of the second track and the third track comprises the generated 3D multimedia data, wherein prior to performing the second track derivation operation the third track did not comprise media data.

21. An apparatus for encoding video data, the apparatus comprising a processor in communication with memory, the processor being configured to execute instructions stored in the memory that cause the processor to:

encode multimedia data comprising a hierarchical track structure comprising at least a first track, a second track, and a third track, wherein:
the first track is at a first level in the hierarchical track structure and comprises first media data;
the second track is at a second level in the hierarchical track structure above the first level of the first track; and
the third track is at a third level in the hierarchical track structure above the first level of the first track and the second level of the second track;

encode first metadata within the first track and second metadata within the second track, wherein the first metadata is different than the second metadata, and the second metadata comprises information associated with the first media data of the first track; and encode third metadata within the third track, wherein the third metadata is different than the first metadata and the second metadata, and the third metadata comprises information associated with second media data that will be generated for the second track, such that the multimedia data can be decoded by:
performing, based on the first metadata and the second metadata, a track derivation operation on the first media data of the first track to generate the second media data of the second track, such that the second track is a derived track of the first track and the second track comprises the second media data, wherein prior to performing the track derivation operation the second track did not comprise media data; and performing, based on the second metadata and the third metadata, a second track derivation operation on the generated second media data of the second track to generate three-dimensional (3D) multimedia data of the third track, such that the third track is a derived track of the second track and the third track comprises the generated 3D multimedia data, wherein prior to performing the second track derivation operation the third track did not comprise media data.

* * * * *